Sept. 16, 1952  J. J. PELOUCH  2,610,810
REEL MECHANISM
Filed Nov. 19, 1947  6 Sheets-Sheet 1

INVENTOR.
James J. Pelouch
BY
Stoodling and Krost
attys

Sept. 16, 1952  J. J. PELOUCH  2,610,810
REEL MECHANISM
Filed Nov. 19, 1947  6 Sheets-Sheet 2

INVENTOR.
James J. Pelouch
BY
Shoodling and Krost
attys.

Sept. 16, 1952  J. J. PELOUCH  2,610,810
REEL MECHANISM

Filed Nov. 19, 1947  6 Sheets-Sheet 3

INVENTOR.
James J. Pelouch
BY
Stradling and Krost
attys.

Sept. 16, 1952     J. J. PELOUCH     2,610,810
REEL MECHANISM Filed Nov. 19, 1947     6 Sheets—Sheet 5

INVENTOR.
James J. Pelouch
BY
Shoodling and Krost
attys.

Sept. 16, 1952     J. J. PELOUCH     2,610,810
REEL MECHANISM Filed Nov. 19, 1947     6 Sheets-Sheet 6

Fig. 17

INVENTOR.
James J. Pelouch
BY
Thoodling and Krost
attys.

Patented Sept. 16, 1952

2,610,810

UNITED STATES PATENT OFFICE 2,610,810

REEL MECHANISM

James J. Pelouch, Cleveland, Ohio, assignor, by mesne assignments, to Farm Tools, Inc., a corporation of Ohio Application November 19, 1947, Serial No. 786,931

17 Claims. (Cl. 242—86)

My invention relates in general to any reel mechanism and in particular to a hose reel mechanism which permits easy unwinding of any length of hose, does not tend to rewind the hose while it is being used and will readily rewind the hose after it has been used.

An object of my invention is to provide the drive means of a moving mass with a valve means responsive to change of movement of the moving mass, the change of movement including acceleration and deceleration.

Another object of my invention is the provision of a reel mechanism which has an inertial mass responsive to change of movement or rotation of an associated member to operate a valve, the change of movement or rotation including both acceleration and deceleration.

Another object of my invention is the provision of a hose reel mechanism which has a valve means responsive to change of rotation of the drum to energize the drive means to rotate the drum.

Another object of my invention is the provision of a hose reel mechanism in which the hose may be partially unwound and will remain partially unwound for easy use of the hose.

Another object of my invention is the provision of a hose reel mechanism in which the unwinding of a part of the hose will cause the hose reel mechanism to wind the hose on the drum.

Another object of my invention is the provision of a hose reel mechanism in which the hose may be partially unwound and will remain partially unwound for easy use of the hose, and in which further unwinding of a part of the hose will cause the hose reel mechanism to wind the hose on the drum.

Another object of my invention is the provision of a hose reel mechanism in which the hose may be partially unwound and in which there is no force tending to rewind the hose while it is being used.

Another object of my invention is the provision of a hose reel mechanism in which an inertia means is responsive to change of rotation of the drum to operate a valve means to control the drive means for rotating the drum.

A further object of my invention is the provision of a hose reel mechanism which has an air valve means responsive to change in rotation of the drum to energize the air driven means to rotate the drum.

A further object of my invention is the provision of a hose reel mechanism which has an inertia means responsive to change of rotation of the drum to operate an air valve means to control the air driven means for rotating the drum.

A still further object of my invention is the provision of a reel mechanism in which a motor means rotates the drum in a first direction and in which the drum may rotate in a second direction with valve means responsive to the change of rotation of the drum in the second direction to energize the motor means and also responsive to the change of rotation of the drum in the first direction to de-energize the motor.

Another object of my invention is the provision in which a clutch interconnects the flywheel and the valve means to permit gradual slowing down of the rotation of the flywheel upon change of rotation of the drum.

A still further object of my invention is the provision in which a clutch interconnects the flywheel and the air valve means to permit gradual slowing down of the rotation of the flywheel upon change of rotation of the drum.

Another object of my invention is to provide an inertial mass which responds to a change of movement of the mass to operate a valve means.

Other objects and a fuller understanding of my invention may be had by referring to the following description and claims, taken in conjunction with the accompanying drawings, in which:

Figures 1, 2:
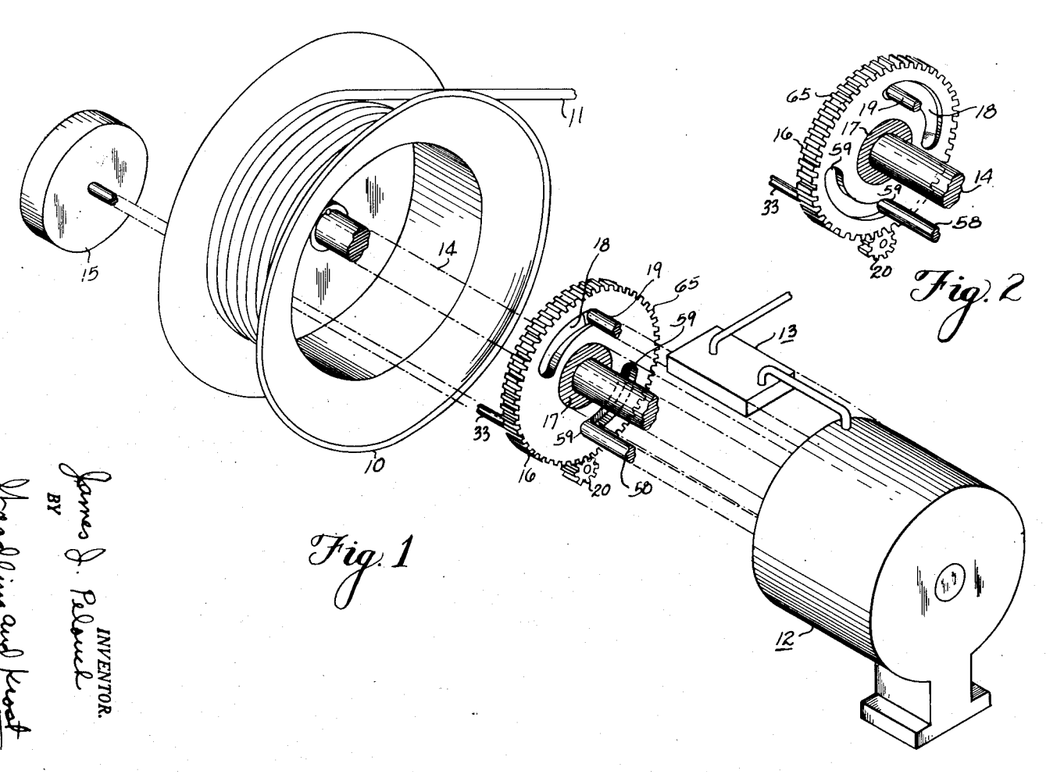
Figure 1 of my drawings is a diagrammatic view of my hose reel mechanism.
Figure 2 is a fragmentary diagrammatic view illustrating another position of the ring gear relative to the valve.

My new and improved hose reel mechanism has a drum or reel 10 rotatable in a winding direction to wind a hose 11 thereon and rotatable in an unwinding direction to permit unwinding of the hose therefrom. A drive means 12 rotates this drum in the winding direction and resists rotation of the drum in the unwinding direction. I have employed a valve means 13 which is responsive to a change of rotation of the drum to control the drive means 12. In Figure 1 of my drawings I diagrammatically illustrate the component parts of my hose reel mechanism. It is understood that my drive means may be an electric motor, an air motor or any other device which will rotate the drum in one direction and resist rotation of the drum in the opposite direction. The valve means 13 which is responsive to change of rotation, is defined in its broad aspect to include air valve, electric switches or such equipment as is necessary to control the operation of the drive means 12. I also use the term "hose" descriptively and intend that its meaning shall include a rope, cable, electric wire or any other flexible member which may be wound on a spool or drum.

The drum or reel 10 is carried by a drive shaft 14 extending from the drive means 12, as is diagrammatically illustrated in Figure 1. A flywheel 15 is journalled in the drum at a distance from the center thereof. The flywheel is carried around the drive shaft 14 by the drum 10 and is also rotated on its own axis. A ring gear 16 is angularly movable on a support collar 17 extending from the drive means 12. The ring gear 16 has a valve operating cam surface 18. The valve means 13 has a valve stem 19 engaging this cam surface 18. When the ring gear 16 is angularly moved from the position as indicated in Figure 1 to the position as indicated in Figure 2, the valve stem 19 and the valve operating cam surface 18 co-operate to operate the valve means 13. A pinion gear 20 engages the teeth of the ring gear 16 and is adapted to travel thereabout. A clutch mechanism 21 interconnects this pinion gear 20 and the flywheel 15 which is journalled in the drum 10. Rotation of the drum 10 in either direction causes the pinion gear 20 to travel at least partially around the ring gear 16 to spin the flywheel 15. A change of rotation or deceleration of the drum causes the flywheel to respond to its own inertial rotation to continue turning the pinion gear 20 and thereby angularly move the ring gear 16. The clutch mechanism 21 which interconnects the flywheel 15 and the pinion gear 20 permits a gradual slowing down of the inertial rotation of the flywheel to prevent damage to the gear teeth or other parts of my hose reel mechanism.

The drum 10 as well as the motive and valve control parts therefore may be housed in a housing 25 having an opening 26 therein through which the hose may be pulled. The drum 10 may be constructed of any convenient design which will readily permit winding and unwinding of a hose thereon. This drum 10 has a bearing portion 30 in which the flywheel 15 is journalled. The drum 10 is adapted to be carried by the drive shaft 14 and has a center portion 31 fastened to the drive shaft 14. The bearing portion 30 is disposed from the center portion 31 of the drum, a distance substantially equal to the radius of the ring gear 16. A counterweight 32 is fastened by bolts, or other suitable means, to the drum 10. This counterweight 32 is disposed on the opposite side of the center portion 31 from the bearing portion 30 to balance the drum. The counterweight is substantially of the same weight as the weight of the flywheel 15.

A pinion 33 extends through the bearing portion 30 to support the flywheel 15. This pinion shaft 33 has the pinion gear 20 fastened on one end thereof and the clutch mechanism 21 on the other end thereof. Although other suitable clutch mechanisms may be used, I desire to use a sleeve 34 pinned to the pinion shaft 33. This sleeve 34 has a flange clutch surface 36 extending thereabout to engage a clutch surface 37 of the flywheel 15. The flange clutch surface 36 on the sleeve 34 is disposed on a plane substantially parallel to the plane of the flywheel 15. A washer 38 is loosely fitted over the sleeve 34 and is urged toward the flange clutch surface 36 by a clutch spring 39. An inner portion 40 of the flywheel 15, which has the clutch surface 37 on the side thereof, is disposed between the flange clutch surface 36 and the washer 38. A spring fastener 41 is fastened to the sleeve 34 and extends outwardly thereof. The spring 39 pushes against this spring fastener 41 to urge the washer 38 toward the flange clutch surface 36 thereby clutchingly connecting the flywheel 15 to the pinion gear 20.

The hose 11 is connected to a source of air or fluid under pressure by means of a swivel joint 43 which is located in the drive shaft 14. The drive shaft has a hole 45 bored in the end with a countersunk hole 46 extending from the bottom of the hole 45. These holes, 45 and 46, provide a shoulder 47 therebetween. A smaller countersunk hole 48 extending from the bottom of the countersunk hole 46 co-operates therewith to provide a shoulder 49. An air passage 50 is drilled through the shaft into the smaller countersunk hole 48. An air connection means 51 fastened to the end of the hose 11 is threaded into this air passage 50. A tubular member 52 carried by an air supply line 53 extends into the smaller countersunk hole 48. Packing 54 and snap rings 55 are fitted into these holes 45 and 46 to prevent escape of air from the smaller countersunk hole 48. The snap rings 55 press the packing 54 against the shoulders to insure a sealed swivel joint which will permit rotation of the drum 10 with respect to the air supply line 53 without losing air pressure in the hose 11.

In my preferred hose reel mechanism I use an air motor for the drive means 12 which rotates the drum in one direction and retards rotation of the drum in the other direction. The drive shaft 14 extends into this air motor. As is illustrated in my drawings, my air motor has a housing 60. This housing 60 is designed preferably to fit within the drum 10. I have also found it advantageous to have that housing 60 support the valve means 13 which controls the operation of the motor.

The support collar portion 17 is a part of the housing 60 and extends outwardly therefrom. The drive shaft 14 extends through that collar portion 17 which supports the ring gear 16. The ring gear 16 is angularly movable on the support collar portion 17. The ring gear 16 has stop portions 59. A stop pin 58 is carried by the housing 60 and extends between these stop portions 59. This stop pin 58 and these stop portions 59 co-operate to limit the angular movement of the ring gear 16 to an amount sufficient to operate the valve means. The distance between the stop portions is substantially equal to the length of the valve operating cam surface 18. A lock washer 62 may be snapped into an annular groove 63 extending about the collar 17 to prevent longitudinal movement of the ring gear 16 on the collar 17. The ring gear 16 has teeth 64 extending thereabout to rotate the pinion gear 20 on its own axis as it travels about the ring gear 16. I have installed a ball bearing race 65 in this collar portion to support the drive shaft 14 which carries the drum 10.

Although other suitable motor means may be used to rotate this drive shaft I discovered a four-cylinder air motor to be very efficient. The cylinders 66, 67, 68 and 69 of this air motor are disposed substantially parallel to the drive shaft 14. A piston 70 having a piston rod 71 with an annular groove 72 therein, reciprocates in the cylinder 66. A piston 73 having a piston rod 74 with an annular groove 75 therein, reciprocates in the cylinder 68. Similarly, a piston having a piston rod with an annular drive groove therein reciprocates in the other cylinders 67 and 69. A wobble plate 82 is fastened to the drive shaft 14 by set screws 83 or by other suitable means such as, for example, sweating or press fit. This wobble plate 82 has a drive ridge 84 extending thereabout and into the annular drive grooves including the drive grooves 72 and 75 on each of the piston rods. As the pistons reciprocate in their respective cylinders these annular drive grooves co-operate with the drive ridge 84 to rotate the wobble plate 82 and the drive shaft 14 therewith.

Figure 3:
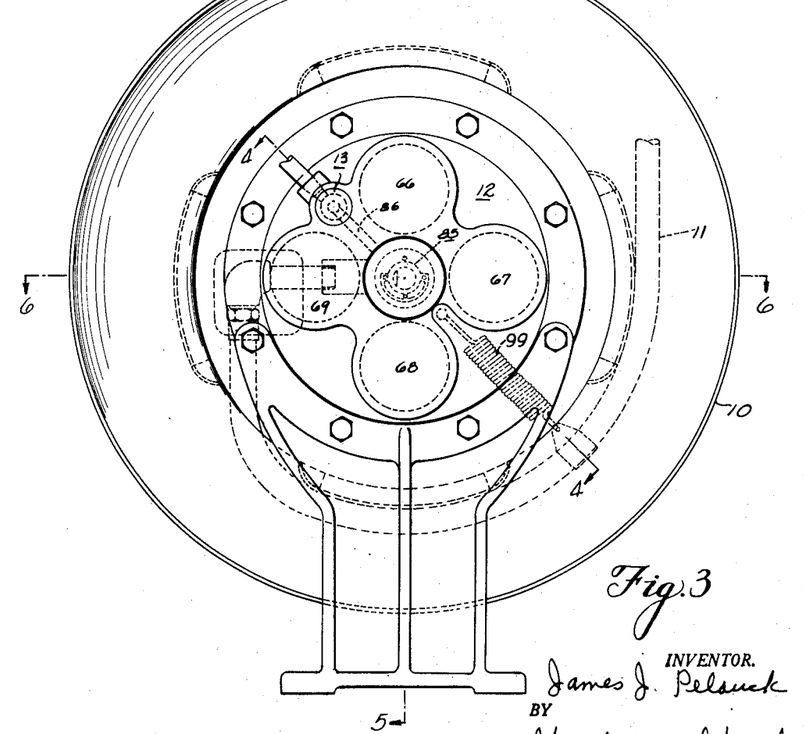
Figure 3 is an end view of my hose reel mechanism.
Figure 4:
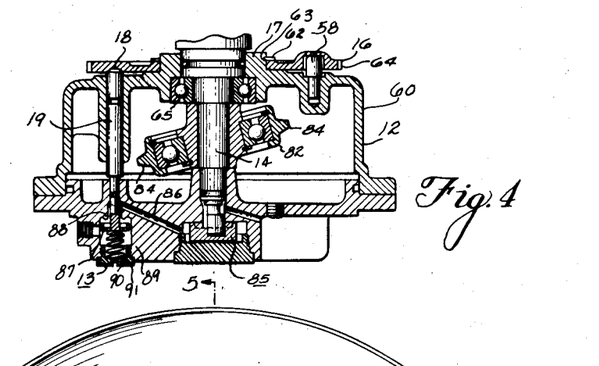
Figure 4 is a fragmentary enlargement along the line 4—4 of Figure 3, and with the drive shaft partly rotated.
Figures 5, 6:
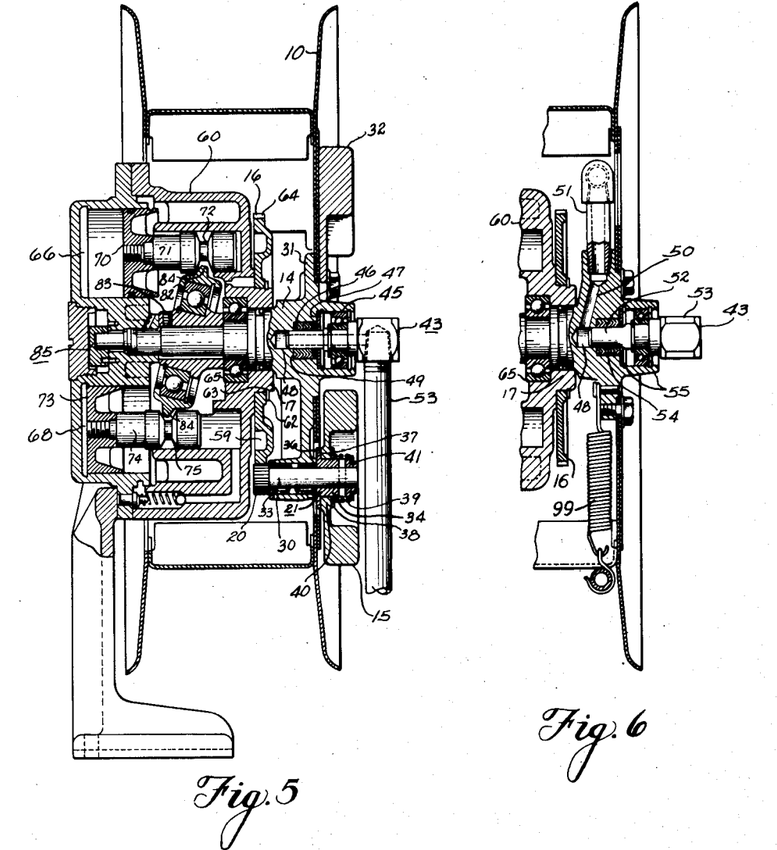
Figure 5 is a cross-sectional view along the line 5—5 of Figure 3, of the hose reel mechanism.
Figure 6 is a fragmentary sectional view along the line 6—6 of Figure 3.

An air distributor valve 85 as illustrated in Figures 3, 4 and 5 of my drawings, distributes air into each of the cylinders in succession. Air under pressure is first admitted in cylinder 66, then 67, 68 and 69 respectively, to reciprocate the piston and thereby turn the wobble plate 82. When the wobble plate 82 is turned the drive shaft is rotated therewith. This air distributor valve 85 engages the drive shaft 14 and is operated thereby to distribute the air into the correct cylinder. An air passage 86 interconnects the air distributor valve 85 and the valve means 13 which controls the energizing and de-energizing of the motor or drive means 12. When the valve means 13 is open, air pressure enters the air distributor valve 85 from a supply of compressed air. When the valve means 13 is closed, the motor is de-energized since compressed air cannot be distributed into the cylinders to cause the motor to run.

The valve means 13 may be any suitable valve which will pass air to energize the motor when it is open and which will prevent passage of air, thus de-energizing the motor when it is closed. This valve means 13 includes valve stem 19 engaging the valve operating cam surface 18 of the ring gear 16. The valve means 13 may be built into the housing of the motor 60 as is illustrated in my drawings. I have used an ordinary valve having a valve head 87 fastened to the end of the valve stem 19 and seatable in a valve seat 88. This valve seat 88 is ground on a valve portion 89 of the motor housing 60. As is illustrated in my drawings, air is admitted into a space behind the valve head 87, thus normally closing the valve to de-energize the motor. When the valve stem 19 is pushed endwise to move the valve head 87 away from the valve seat 88, the compressed air passes around the valve head and along the valve stem 19 into the air passage 86 and toward the air distributor valve 85. Although the air pressure will normally hold the valve closed, I have installed a valve spring 90 to positively close the valve. This valve spring 90 may be held against the head portion 87 of the valve and within the valve portion 89 of the motor housing 60 by a cap screw 91 threaded into the motor housing.

Figures 7, 9, 12:
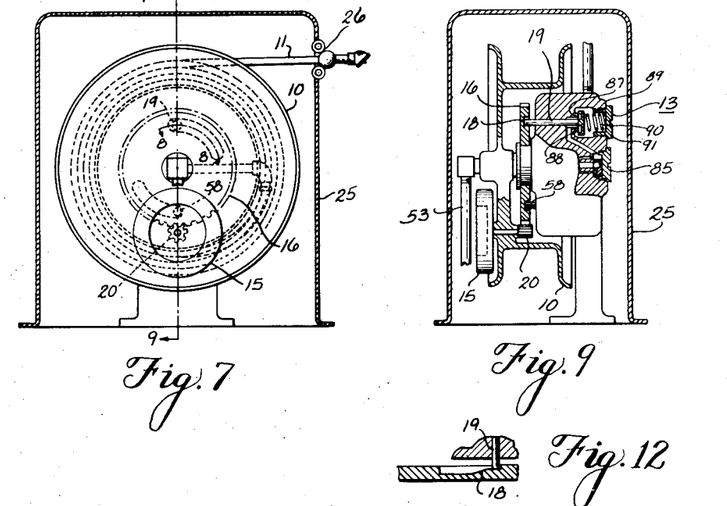
Figure 7 is a sectional view of my hose reel mechanism with certain parts omitted for clarity and illustrating the position of the component parts when the hose is wound on the drum.
Figure 9 is a sectional view taken along the line 9—9 of Figure 7.
Figure 12 is a fragmentary sectional view along the line 12—12 of Figure 11.
Figure 8:
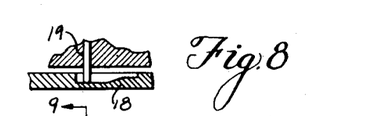
Figure 8 is a fragmentary sectional view taken along the line 8—8 of Figure 7.
Figure 10:
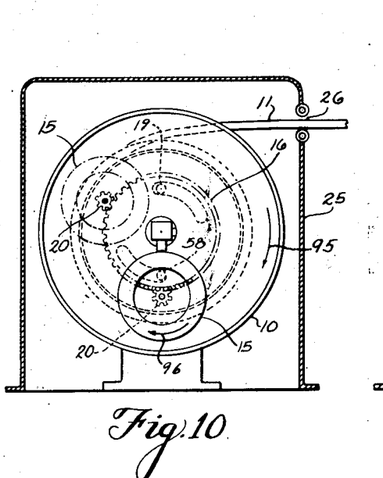
Figure 10 is a sectional view of my hose reel mechanism with certain parts omitted for clarity and illustrating the position of the component parts upon a change of rotation of the drum in an unwinding direction.

In my drawings, the Figures 7 through 15 illustrate the operation of my new and improved hose reel mechanism. I have housed the hose reel mechanism in the housing 25 having opening 26 therein through which the hose is pulled. In these drawings I have schematically illustrated the valve means which controls the motor. In Figure 7, the hose is completely wound on the drum and the valve means 13 is closed, thus the motor is de-energized. Figure 8 illustrates the relationship between the valve stem 19 and the cam surface 18 when the motor is de-energized and when all the parts in my hose reel mechanism are at a standstill. Figure 9 also illustrates in cross-section, the position of the component parts of my hose reel mechanism at this time. When the operator wishes to use the hose 11 he simply pulls the hose out of the opening 26 and the housing 25. This rotates the drum 10 in an unwinding direction as indicated by the arrow 95 in Figure 10. During this time the valve means 13 remains closed, thus the motor is de-energized and acts as a friction device to retard unwinding rotation of the drum. The flywheel 15, which is journaled in the drum 10, is carried about during the unwinding of the hose. The pinion gear 20 engages the teeth in the ring gear 16 as it travels about the ring gear to cause the flywheel to spin on its own axis and in the direction of the arrow 96 in Figure 10. Figure 10 illustrates the position of the parts of my improved hose reel mechanism at the instant the operator stops unwinding the hose from the drum. The motor is turned off or de-energized and the flywheel is spinning or rotating on its own axis.

Figure 11:
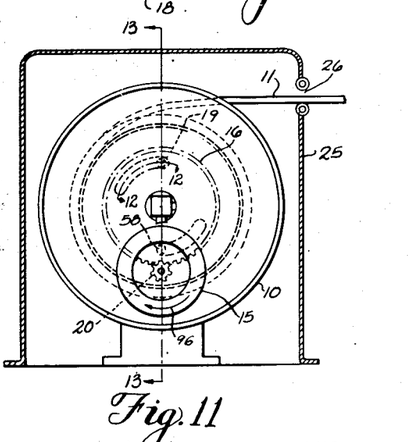
Figure 11 is a sectional view of my hose reel mechanism with certain parts omitted for clarity and illustrating the position of the component parts after the valve means has responded to the change of rotation of the drum in the unwinding direction.

Proceeding from Figure 10 to Figure 11, my drawings illustrate the angular movement of the ring gear 16 by the continued inertial spinning of the flywheel 15. During this step between Figure 10 and Figure 11, the drum remains relatively stationary and the flywheel 15, because of its inertia, angularly moves the ring gear 16 to cause the cam surface 18 to move the valve stem 19 endwise to open the valve means 13. This moving of the valve stem 19 endwise by the cam surface 18 on the ring gear 16 is illustrated in Figure 12.

Figure 13:
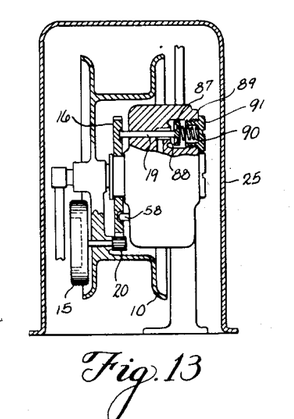
Figure 13 is a fragmentary sectional view along the line 13—13 of Figure 11.

The illustration in Figure 13 is a cross-sectional view of my hose reel mechanism at this time and immediately after the valve means 13 has been opened to energize the motor or drive means 12.

Figure 14:
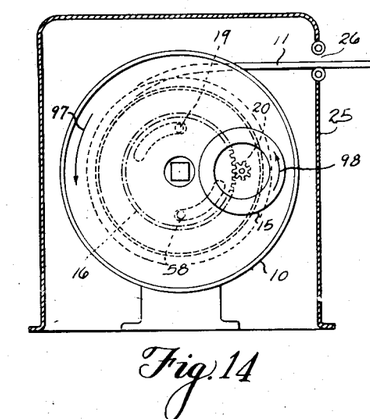
Figure 14 is a sectional view of my hose reel mechanism with certain parts omitted for clarity and illustrating the position of the component parts rewinding the hose.

This energization of the motor or drive means 12 will operate through the distributor valve 85 to operate the motor and thus cause it to rotate the drum 10 in a winding direction. The rotation of the drum 10 in this winding direction is illustrated in Figure 14. The arrow 97 in Figure 14 represents the winding direction. Again the flywheel 15 is carried about the ring gear 16 thus causing the pinion gear 20 to travel about the ring gear and spin the flywheel. The rotation of the drum 10 in the winding direction causes the flywheel 15 to spin in the direction illustrated by the arrow 98 in Figure 14. If the operator let go of the hose at this time, it would be completely reeled onto the drum; however, should the operator wish to use the hose without having back tension or forces tending to wind the hose on it, he simply holds the hose tight for a short period of time. After the drum has rotated in the winding direction sufficiently to wind slack in the hose and to spin the flywheel in the direction illustrated by the arrow 98, the drum comes to rest. I have illustrated this position in Figure 14 by the solid lines illustrating the flywheel and other component parts of my hose reel mechanism. It is to be understood that although I have illustrated the drum as rotating only about one-fourth turn in the winding direction between the Figures 11 and 14, it may rotate any number of turns or any portion of a turn before being brought to the stop position illustrated in Figure 14.

Figure 15:
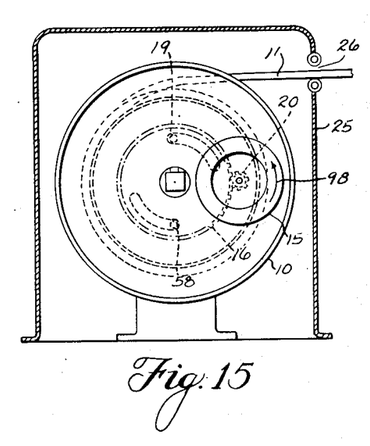
Figure 15 is a sectional view of my hose reel mechanism with certain parts omitted for clarity and illustrating the position of the component parts after the valve means has responded to the change of rotation of the drum in the winding direction.

Immediately after the drum has stopped rotating in the winding direction, the inertia of the flywheel causes it to continue to spin and thereby angularly move the ring gear 16 to the position as illustrated in the Figure 15. Since the flywheel is rotating in the opposite direction from the unwinding rotation of the drum to that in which it rotates from the winding rotation of the drum, the ring gear 16 is also moved angularly in the opposite direction. The valve stem 19 and the valve operating cam surface 18 on the ring gear co-operate to permit the valve means 13 to close to de-energize the motor or drive means 12. After the motor has been de-energized the hose 11 may be freely used without having any forces exerted to wind it onto the drum. I have discovered that many pounds of air pressure may be forced through the hose in my hose reel mechanism, without causing any forces tending to rewind the hose to be exerted upon it.

Figure 16:
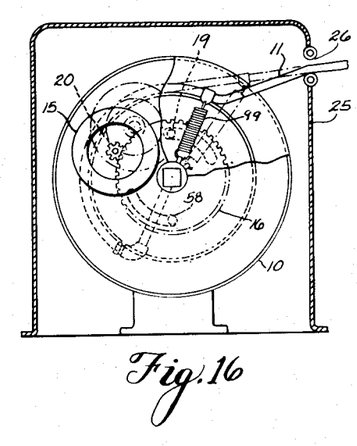
Figure 16 illustrates a spring which insures that a part of the hose is always wound on the drum so that the motor may be started to rewind the hose, and, Figure 17 is a modification of my invention.

When the operator is through using the hose, he simply has to pull the hose a short distance to rotate the drum in the unwinding direction. A portion of a rotation of the drum in the unwinding direction is generally sufficient to spin the flywheel. The flywheel, because of its inertia, will operate as between Figures 7 and 10 to open the valve means 13 and cause energization of the motor or drive means 12 to rewind the hose. Figure 16 illustrates the connection of a spring 99 between the hose and the drive shaft 14 which carries the drum. This spring 99, normally compressed, maintains a short part of the hose wound onto the drum. Thus, should the operator accidentally unwind the hose clear to the end, the spring will insure a means of rotating the drum in a very short unwinding direction to operate the flywheel to start the motor.

In my description of operation of my new and improved hose reel mechanism, I have completely stopped the drum from rotating in either direction to better illustrate the operating of the valve means which responds to the inertial movement of the flywheel. It is understood that a mere change of rotation will cause the flywheel to operate the valve means. This change of rotation of the drum in either the winding or unwinding direction may be a complete reversal of direction of rotation or a change in the speed of rotation. When the drum is rotated at a uniform speed, the inertial mass of the flywheel is uniform; however, if the drum suddenly decelerates or stops the inertial mass of the flywheel will cause it to continue spinning and thus angularly rotate the ring gear.

Figure 17:
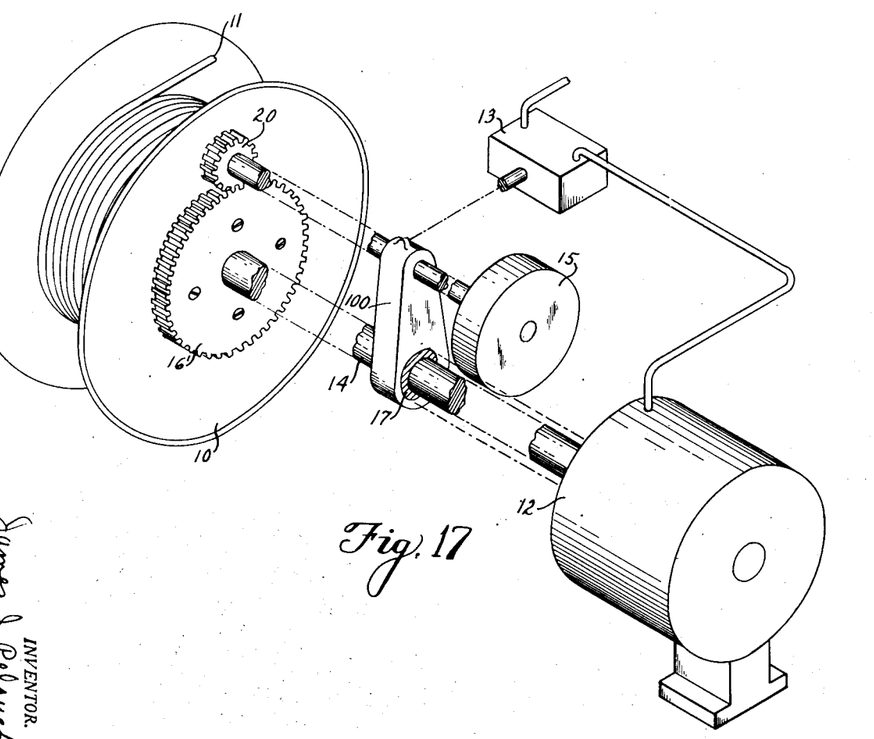

In Figure 17 of my drawings, I illustrate a modification of my mechanism. In this modification the ring gear is fastened to the drum or reel and rotates therewith. An arm 100 having a flywheel journalled in the end thereof, is pivotally supported to operate the valve means. The pinion gear 20 fastened to the flywheel 15 spins the flywheel 15 when the ring gear 16' is rotated by the drum. A change of rotation of the drum causes the pinion gear to travel partly about the ring gear. When the pinion gear is caused to travel about the ring gear by the inertial mass of the flywheel, the arm is pivotally moved to operate the valve means.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a member movable in a first direction and in a second direction, drive means to move said member in one of said directions, valve means to control the drive means, and inertia means operably associated with said member and responsive to change of movement of said member to operate said valve means, said valve means controllingly connected to said movable member and to said inertia means and operated thereby upon relative movement between said movable member and said inertia means.

2. In combination, a member movable in a first direction and in a second direction, means to move said member in said first direction and to resist movement of said member in said second direction, a valve to control said means, and a body operatively associated with said member and inertially responsive to change of movement of said member to operate said valve, said valve means controllingly connected to said movable member and to said inertia body and operated thereby upon relative movement between said member and said inertia body.

3. In a hose reel mechanism, a reel rotatable in a winding direction and in an unwinding direction, drive means to rotate said reel in one of said directions, a valve to control said drive means, a flywheel journalled in said reel, and a member co-operatively associated with said flywheel and responsive to inertial rotation of the flywheel upon a deceleration of rotation of said reel to operate said valve.

4. In a hose reel mechanism, a reel rotatable in a first direction and in a second direction, motor means to rotate said reel in said first direction and to resist rotation of said reel in said second direction, a valve to energize and to de-energize said motor means, a flywheel journalled in said reel and responsive to movement thereof, a member co-operatively associated with said flywheel and responsive thereto to cause said valve to energize said motor means upon change of rotation of said drum in said second direction and also to cause said valve to de-energize said motor means upon change of rotation of said reel in said first direction.

5. In a hose reel mechanism, a reel rotatable in a first direction and in a second direction, motor means to rotate said reel in said first direction and to resist rotation of said reel in said second direction, a valve to energize and to de-energize said motor means, a flywheel journalled in said reel and responsive to movement thereof, a member co-operatively associated with said flywheel and responsive thereto to cause said valve to energize said motor means upon deceleration of rotation of said reel in said second direction and also to cause said valve to de-energize said motor means upon deceleration of rotation of said reel in said first direction.

6. In a hose reel mechanism, a reel rotatable in a winding direction and in an unwinding direction, air driven means to rotate said reel in one of said directions, an air valve to control said air driven means, a flywheel journalled in said reel, and a member co-operatively associated with said flywheel and responsive to inertial rotation of the flywheel upon a change of rotation of said reel to operate said air valve.

7. In a hose reel mechanism, a reel rotatable in a first direction and in a second direction, air motor means to rotate said reel in said first direction and to resist rotation of said reel in said second direction, an air valve to energize and to de-energize said air motor means, and inertia means mounted in said reel and responsive to change of rotation of said reel in said second direction to cause said air valve to energize said air motor means, said inertia means also responsive to change of rotation of said reel in said first direction to de-energize said air motor means.

8. In a hose reel mechanism, a reel rotatable in a first direction and in a second direction, air motor means to rotate said reel in said first direction and to resist rotation of said reel in said second direction, an air valve to energize and to de-energize said air motor means, a flywheel journalled in said reel and responsive to movement thereof, a member co-operatively associated with said flywheel and responsive thereto to cause said air valve to energize said air motor means upon deceleration of rotation of said reel in said second direction and also to cause said air valve to de-energize said air motor means upon deceleration of rotation of said reel in said first direction.

9. In a hose reel mechanism, a reel rotatable in a winding direction and in an unwinding direction, drive means to rotate said reel in one of said directions, a valve to control said drive means, a flywheel journalled in said reel, a ring gear angularly movable upon change or rotation of the flywheel to operate said valve, a clutch, and a pinion gear connected to the flywheel by the said clutch and adapted to travel around the ring gear to cause rotation of the flywheel and to cause angular movement of the ring gear upon change of rotation of the flywheel.

10. In a hose reel mechanism, a reel rotatable in a first direction and in a second direction, motor means to rotate said reel in said first direction and to resist rotation of said reel in said second direction, valve means to energize and to de-energize said motor means, a flywheel journalled in said reel, a ring gear angularly movable upon change of rotation of the flywheel to operate said valve means, a clutch, and a pinion gear connected to the flywheel by the clutch and adapted to engage the ring gear to cause rotation of the flywheel and to cause angular movement of the ring gear upon change of rotation of the flywheel.

11. A mechanism comprising, a movable means, moving means operatively connected to said movable means to move the movable means, a mass associated with one of said means and capable of receiving inertial energy therefrom, interconnection means interconnecting said mass and one of said means for moving said mass, said interconnection means including a member movable upon relative movement between said one of said means and said mass, and valve means actuated by said member for controlling said moving means.

12. A mechanism comprising, a rotatable means, rotating means operatively connected to said rotatable means to rotate the rotatable means, a mass associated with one of said means and capable of receiving inertial energy therefrom, interconnection means interconnecting said mass and one of said means for rotating said mass, said interconnection means including a member movable upon relative movement between said one of said means and said mass, and valve means actuated by said member for controlling said moving means.

13. A mechanism comprising, a rotatable means, drive means operatively connected to said rotatable means to rotate the rotatable means, a mass journaled in the rotatable means and capable of receiving inertial energy therefrom, interconnection means interconnecting said mass and one of said means for rotating said mass, said interconnection means including a member movable upon relative movement between said one of said means and said mass, and valve means actuated by said member for controlling said moving means.

14. A mechanism comprising, a movable means movable in a first direction and in a second direction, means operatively connected to said movable means to move the movable means in the first direction and to resist movement of the movable means in the second direction, a mass associated with said movable means and capable of receiving inertial energy therefrom, interconnection means interconnecting said mass and one of said means for moving said mass, said interconnection means including a member movable upon relative movement between said one of said means and said mass, and valve means actuated by said member for controlling said moving means.

15. A mechanism comprising, a rotatable means rotatable in a first direction and in a second direction, means operatively connected to said rotatable means to rotate the rotatable means in the first direction and to resist rotation of the rotatable means in the second direction, a mass associated with said rotatable means and capable of receiving inertial energy therefrom, interconnection means interconnecting said mass and one of said means for rotating said mass, said interconnection means including a member movable upon relative movement between said one of said means and said mass, and valve means actuated by said member for controlling said moving means.

16. A mechanism comprising, a movable means movable in a first direction and in a second direction, air means operatively connected to said movable means to move the movable means in the first direction and to resist movement of the movable means in the second direction, a mass associated with said movable means and capable of receiving inertial energy therefrom, interconnection means interconnecting said mass and said air means for moving said mass, said interconnection means including a member movable upon relative movement between said air means and said mass, and air valve means actuated by said member for controlling said air means.

17. A mechanism comprising, a movable means, air means operatively connected to said movable means to move the movable means, a mass associated with the movable means and capable of receiving inertial energy therefrom, interconnection means interconnecting said mass and said air means for moving said mass, said interconnection means including a member movable upon relative movement between said air means and said mass, and air valve means actuated by said member for controlling said air means.

JAMES J. PELOUCH.

REFERENCES CITED

The following references are of record in the file of this patent:

UNITED STATES PATENTS

| Number | Name | Date |
|---|---|---|
| 2,166,054 | Holmes et al. | July 11, 1939 |
| 2,368,293 | Garancher | Jan. 30, 1945 |
| 2,425,496 | Tyler | Aug. 22, 1947 |